United States Patent
Sumi

(10) Patent No.: US 9,846,310 B2
(45) Date of Patent: Dec. 19, 2017

(54) 3D IMAGE DISPLAY DEVICE WITH IMPROVED DEPTH RANGES

(71) Applicant: Innolux Corporation, Chu-Nan, Miao-Li County (TW)

(72) Inventor: Naoki Sumi, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 267 days.

(21) Appl. No.: 14/746,214

(22) Filed: Jun. 22, 2015

(65) Prior Publication Data
US 2016/0370595 A1    Dec. 22, 2016

(51) Int. Cl.
*G02B 27/22*    (2006.01)

(52) U.S. Cl.
CPC ................ *G02B 27/2214* (2013.01)

(58) Field of Classification Search
CPC .............. H01L 2924/00; H04N 5/2254; H04N 13/0022; H04N 2013/0081; H04N 5/23238; H04N 5/23212; G02B 13/0015; G02B 27/2214; G02B 5/20; G02B 27/1066; G02B 27/123; G02B 3/0006; G06T 2207/10052
See application file for complete search history.

(56) References Cited

U.S. PATENT DOCUMENTS

| 8,408,775 | B1 * | 4/2013 | Coleman ........... G02F 1/133526 362/602 |
| 2011/0164036 | A1 * | 7/2011 | De Zwart .......... G02B 27/2214 345/419 |
| 2013/0335649 | A1 * | 12/2013 | Mather ................ G02F 1/1323 349/15 |
| 2014/0078259 | A1 * | 3/2014 | Hiramoto .......... H01L 27/14627 348/46 |
| 2015/0181206 | A1 * | 6/2015 | Kim .................. G02F 1/133603 345/690 |
| 2017/0102545 | A1 * | 4/2017 | Hua .................... G02B 27/0172 |

FOREIGN PATENT DOCUMENTS

| CN | 102981196 A | 3/2013 |
| CN | 103698967 A | 4/2014 |
| JP | 2005-10755 A | 1/2005 |
| JP | 2011-90117 A | 5/2011 |
| JP | 4900618 B2 | 3/2012 |
| JP | 5646110 B2 | 12/2014 |

OTHER PUBLICATIONS

Taiwanese Office Action dated Mar. 21, 2017.

* cited by examiner

*Primary Examiner* — Huyen Ngo
(74) *Attorney, Agent, or Firm* — Rabin & Berdo, P.C.

(57) ABSTRACT

An image display device is provided. The image display device includes a 3D display module and an optical component disposed above the 3D display module. The 3D display module includes a backlight source and a plurality of pixels disposed above the backlight source, wherein the pixels provide a plurality of view units, and each of the view units includes a plurality of views. Lights from the backlight source are concentrated at a virtual focus point, and the backlight source is located between the virtual focus point and the optical component.

16 Claims, 5 Drawing Sheets

3D IMAGE DISPLAY DEVICE WITH IMPROVED DEPTH RANGES

TECHNICAL FIELD

The disclosure relates in general to an image display device, and more particularly to an image display device producing 3D images with improved depth ranges.

BACKGROUND

Recently, high density light field displays and/or super multi-view displays (SMV) have been developed to produce 3D images with wide depth ranges in naked-eye 3D display devices. On the other hand, floating image displays have been a developing new technology for displaying floating images in the air, which is a promising start for the human interactive display devices in the future.

While the currently developed floating images are still two-dimensional images, how to provide 3D floating images has become a prominent task to the industries.

SUMMARY

The disclosure is directed to an image display device. In the embodiments, the optical component is located between the observer and the backlight source of the 3D display module, and hence the as-formed 3D image has a relatively wide depth range and is fully separated from the top surface of the image display device; as such, a 3D floating image is formed, and thus an image display device with full depth range human interaction is achieved.

According to one embodiment of the disclosure, an image display device is provided. The image display device includes a 3D display module and an optical component disposed above the 3D display module. The 3D display module includes a backlight source and a plurality of pixels disposed above the backlight source, wherein the pixels provide a plurality of view units, and at least one of the view units includes a plurality of views. Lights from the backlight source are concentrated at a virtual focus point, and the backlight source is located between the virtual focus point and the optical component.

The above and other aspects of the invention will become better understood with regard to the following detailed description of the preferred but non-limiting embodiment(s). The following description is made with reference to the accompanying drawings.

DETAILED DESCRIPTION

According to the embodiments of the disclosure, in the image display device, the optical component is located between the observer and the backlight source of the 3D display module, and hence the as-formed 3D image has a relatively wide depth range and is fully separated from the top surface of the image display device; as such, a 3D floating image is formed, and thus an image display device with full depth range human interaction is achieved.

Detailed descriptions of the embodiments of the disclosure are disclosed below with accompanying drawings. In the accompanying diagrams, the same numeric designations indicate the same or similar components. It should be noted that accompanying drawings are simplified so as to provide clear descriptions of the embodiments of the disclosure, and the following detailed description are exemplary and explanatory only and are not restrictive of the disclosed embodiments as claimed. Anyone who is skilled in the technology field of the disclosure can make necessary modifications or variations to the structures according to the needs in actual implementations.

Figure 1:
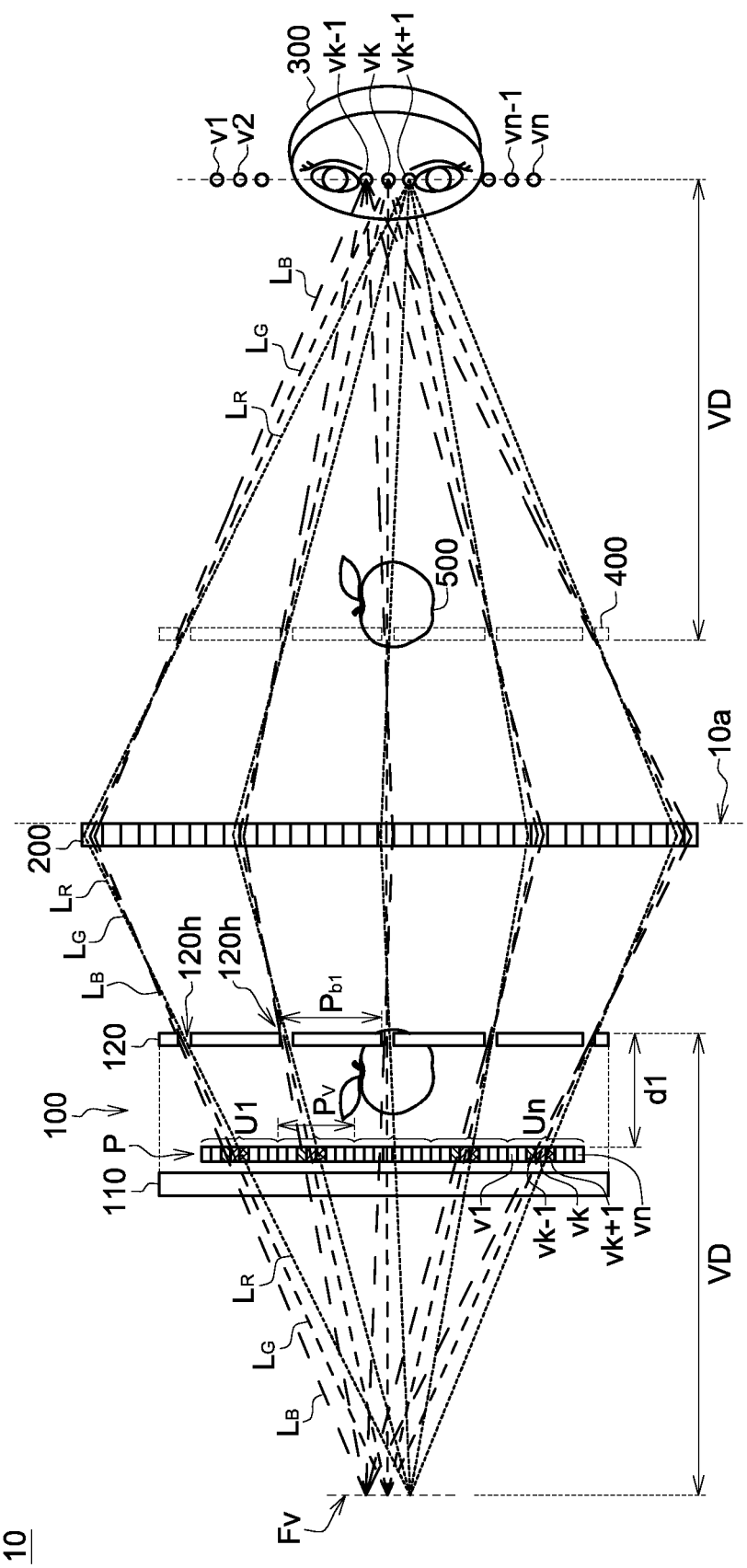
FIG. 1 is a schematic view of an image display device according to an embodiment of the present disclosure.

FIG. 1 is a schematic view of an image display device 10 according to an embodiment of the present disclosure. As shown in FIG. 1, the image display device 10 includes a 3D display module 100 and an optical component 200 disposed above the 3D display module 100. The 3D display module 100 includes a backlight source 110 and a plurality of pixels P disposed above the backlight source 110. The pixels P provide a plurality of view units U1-Un, and at least one of the view units (ex.U1) includes a plurality of views v1-vn. The image display device 10 has a top surface 10a facing an observer 300, As shown in FIG. 1, lights from the backlight source 110 are concentrated at a virtual focus point Fv, and the backlight source 110 is located between the virtual focus point Fv and the optical component 200.

In the embodiment, as shown in FIG. 1, the 3D display module 100 may include a parallax barrier 120 disposed between the optical component 200 and the backlight source 110. In the embodiment, the parallax barrier 120 is such as a switchable liquid crystal (LC) parallax barrier.

As shown in FIG. 1, the parallax barrier 120 has a plurality of openings 120h, and each of the openings 120h are separated by a front barrier pitch Pb1. Additionally, the view units have a view unit pitch Pv. For example, at least one of the view units has a view unit pitch Pv. In other word, each of the view units includes views v1-vn, and the view unit pitch Pv is defined as the distance between two views v1 in two adjacent view units. For example, the view unit pitch Pv is the distance between the view v1 in the view unit U1 and the view v1 in the view unit adjacent to the view unit U1 (ex.U2). In the embodiment, the view unit pitch Pv is smaller than the front barrier pitch Pb1. As shown in FIG. 1, while the condition of Pb1>Pv is satisfied, the virtual focus point Fv is thus located at the rear side of the 3D display module 100.

In the embodiment, as shown in FIG. 1, the distance from the virtual focus point Fv to the parallax barrier 120 is defined as a distance VD, and the distance from the parallax barrier 120 to the pixels P is defined as a distance d1. The ratio of the front barrier pitch Pb1 to the view unit pitch Pv is VD/(VD−d1). The distance from the observer 300 to a virtual floating base plane 400 where a 3D floating image 500 formed is equal to the distance from the virtual focus point to the parallax barrier.

Referring to FIG. 1, in the embodiments of the present disclosure, the backlight source 110 is such as a normal backlight, and the pixels P of the 3D display module 100 are allocated to generate multi-views, such as 32 views or even more views. The parallax barrier 120 of the 3D display module 100 is such as a switchable LC parallax barrier which separates and guides light rays from pixels P to many view directions based on the multi-view 3D design and thus obtains high density light rays. According to the embodiments of the present disclosure, the angular difference between the lights through the adjacent views is such as 0.1-0.4 degrees. For example, the angular difference between V1 and V2 at the same view unit is such as 0.1-0.4 degrees.

As shown in FIG. 1, the optical axes of each of the light rays $L_B$, $L_G$, and $L_R$ passing through the corresponding openings 120h and the corresponding view point via the corresponding pixel are concentrated into the virtual focus point Fv at the rear side of the 3D display module 100. As the light rays $L_B$, $L_G$, and $L_R$ along the optical axes pass through the parallax barrier 120 and the optical component 200 and then direct to the observer's eyes, the arrangement of the views v1-vn reverses twice; for example, in a view unit having n views, the arrangement of an order of v1, v2 . . . yk−1, vk, yk+1 . . . vn−1, vn is reversed to an order of vn, vn−1 . . . vk+1, vk, vk−1 . . . v2, v1 when the light rays passing through the parallax barrier 120, and then reversed back to the order of v1, v2 . . . yk−1, vk, yk+1 . . . vn−1, vn when the light rays passing though the virtual floating base plane 400. As such, the light rays for the right eye view is directed to the left eye, and the light rays for the left eye view is directed to the right eye, which is different from the conventional naked-eye 3D design of directing light rays for the right eye view to the right eye and directing light rays for the left eye view to the left eye. In other words, the order of the views the pixels P provide is the same as the order of the views the observer 300 sees, which is different from the conventional naked-eye 3D design that the views the observers see are in reverse order to the views provided by the pixels P. In summary, the order of the views in front of the optical component 200 over at least a first distance is the same as the order of views provided by the pixels P, and the first distance is between the optical component 200 and the backlight source 110.

Moreover, as shown in FIG. 1, according to the embodiments of the present disclosure, the optical component 200 is located between the top surface 10a and the backlight source 110 of the 3D display module 100, and hence the as-formed 3D image 500 has a relatively wide depth range and is fully separated from the top surface 10a. As such, a 3D floating image is formed, and thus an image display device with full depth range human interaction is achieved.

According to the embodiments of the present disclosure, the optical component 200 may include a crossed corner mirror array, a micro prism, a micro lens array, or a double lenticular lens film.

Figure 2B:
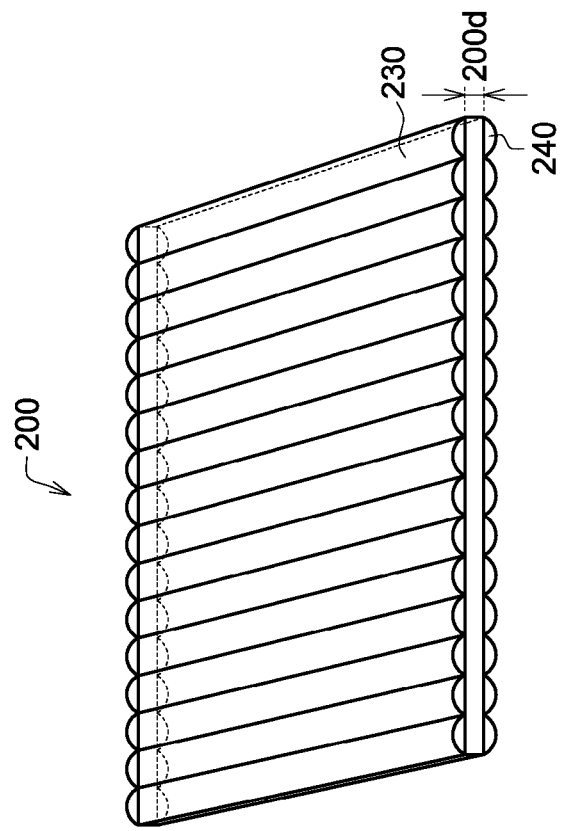
FIG. 2B is a schematic view of an optical component according to another embodiment of the present disclosure.
Figure 2A:
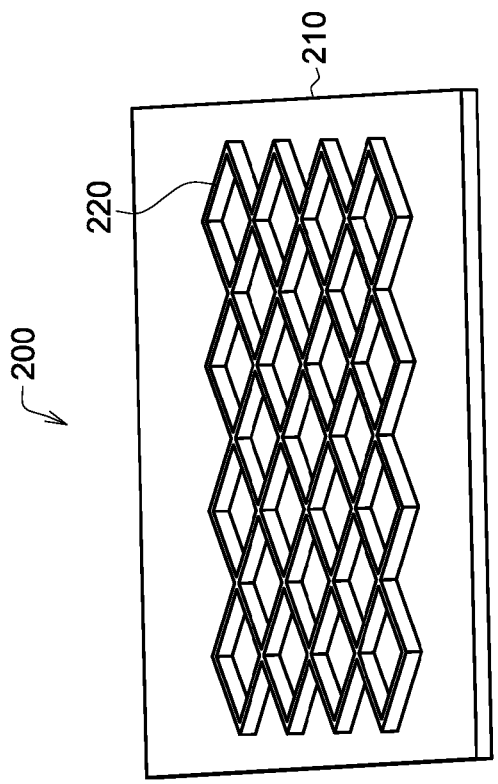
FIG. 2A is a schematic view of an optical component according to an embodiment of the present disclosure.

FIG. 2A is a schematic view of an optical component 200 according to an embodiment of the present disclosure. Referring to FIG. 2A, the optical component 200 in the embodiment as shown in FIG. 2A is a crossed corner mirror array, and the crossed corner mirror array includes a transparent substrate 210 and vertical mirror walls 220 with crossing angles of about 90 degrees disposed on the transparent substrate 210. The transparent substrate 210 may be a glass substrate or a plastic substrate, and the mirror walls 220 may be made of aluminum or silver.

FIG. 2B is a schematic view of an optical component 200 according to another embodiment of the present disclosure. Referring to FIG. 2B, the optical component 200 in the embodiment as shown in FIG. 2B is a double lenticular lens film with an afocal optical system, and the double lenticular lens films includes two lenticular lens layers 230 and 240 disposed opposite to each other. That is, as the distance between the two lenticular lens layers 230 and 240 is defined as a distance 200d, the two lenticular lens layers 230 and 240 has a focal length f, and an afocal optical system satisfies the following condition: d=2f.

However, the selections of types of the optical component 200 applied in the embodiments of the present disclosure can vary according to actual needs and are not limited to the above examples.

Figure 3:
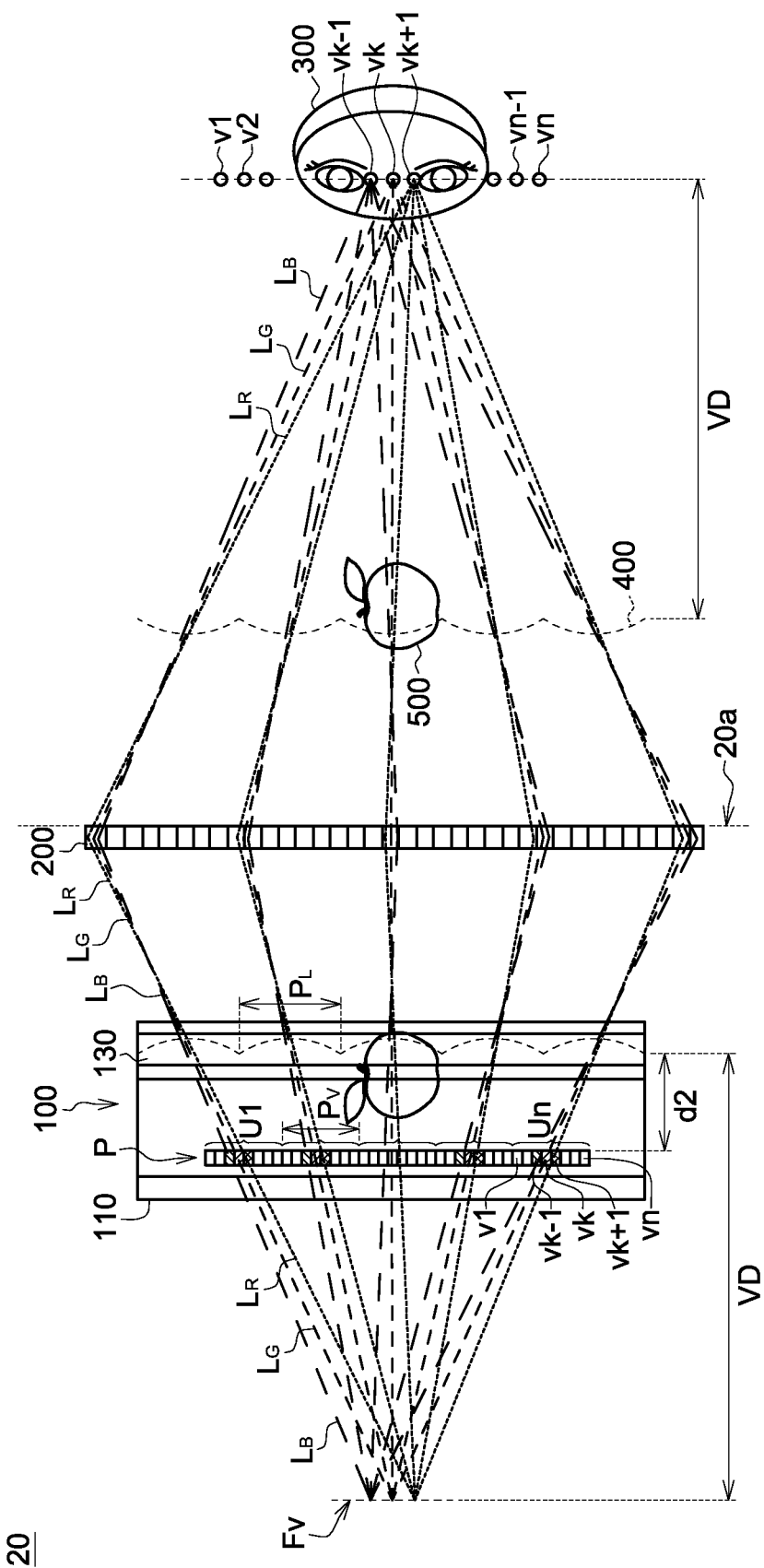
FIG. 3 is a schematic view of an image display device according to another embodiment of the present disclosure.

FIG. 3 is a schematic view of an image display device 20 according to another embodiment of the present disclosure. The elements in the present embodiment sharing the same or similar labels with those in the previous embodiment are the same or similar elements, and the description of which is omitted.

In the embodiment, as shown in FIG. 3, the image display device 20 has a top surface 20a facing the observer 300, and the 3D display module 100 may include a lens array 130 disposed between the optical component 200 and the backlight source 110. In the embodiments, the lens array 130 may be a lenticular lens array (not shown in drawings) or a liquid crystal (LC) gradient index (GRIN) lens array.

In the embodiment, the lens array 130 includes a plurality of optical lenses, each of the optical lenses are separated by a lens pitch $P_L$, and the view unit pitch Pv of the view units is smaller than the lens pitch $P_L$.

For example, as shown in FIG. 3, the lens array 130 is an LC GRIN lens array forming a plurality of optical lenses, and the view unit pitch Pv of the view units is smaller than the lens pitch $P_L$ of the LC GRIN lens array. In another embodiment, the lens array 130 may be a lenticular lens array including a plurality of lenticular lenses, and the view unit pitch Pv of the view units is smaller than the lens pitch $P_L$ of the lenticular lenses of the lenticular lens array. As shown in FIG. 3, while the condition of $P_L$>Pv is satisfied, the virtual focus point Fv is thus located at the rear side of the 3D display module 100.

In the embodiment, as shown in FIG. 3, the distance from the lens array 130 to the pixels is defined as a distance d2, and a ratio of the lens pitch $P_L$ to the view unit pitch Pv is VD/(VD−d2).

Figure 4:
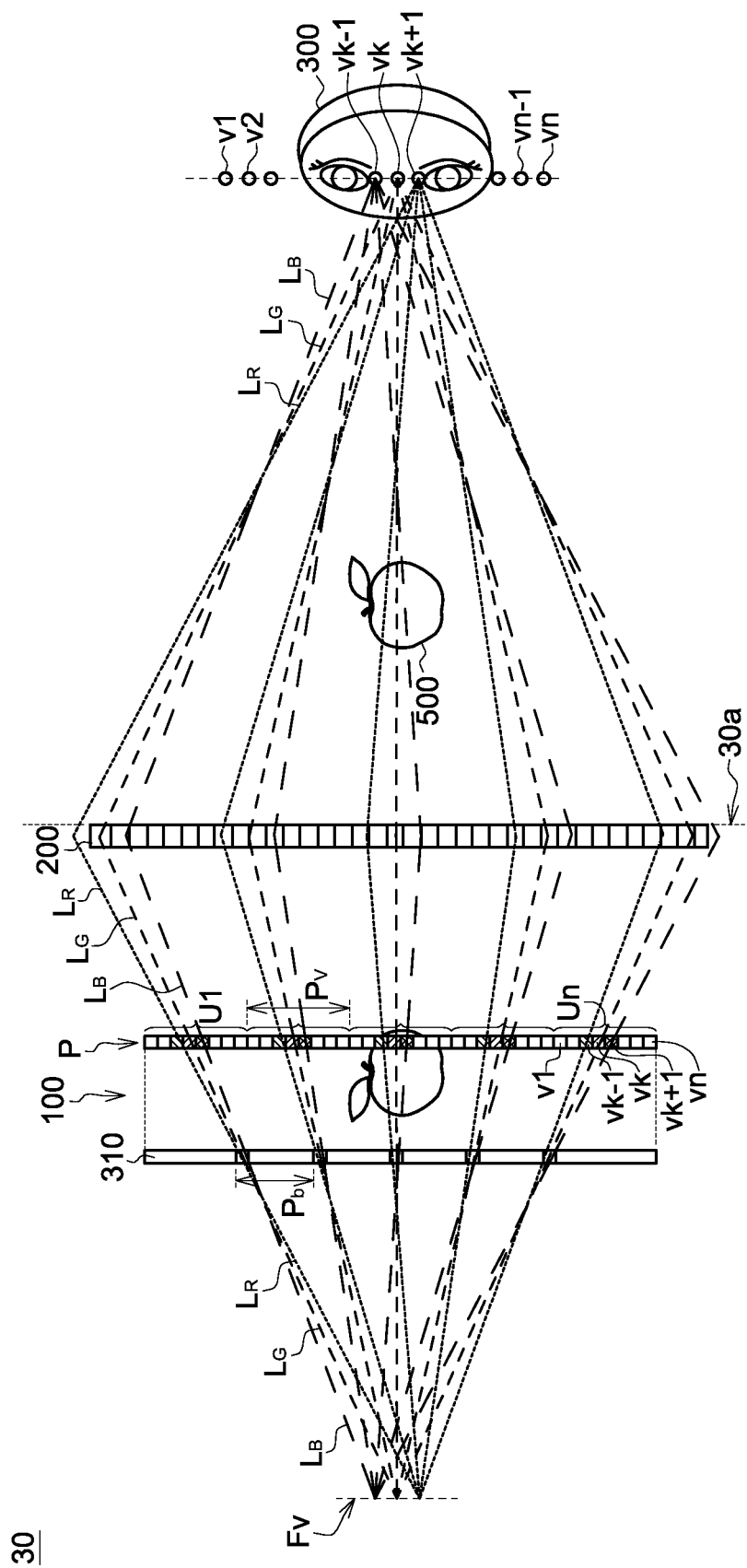
FIG. 4 is a schematic view of an image display device according to a further embodiment of the present disclosure.

FIG. 4 is a schematic view of an image display device 30 according to a further embodiment of the present disclosure. The elements in the present embodiment sharing the same or similar labels with those in the previous embodiment are the same or similar elements, and the description of which is omitted.

In the embodiment as shown in FIG. 4, the image display device 30 has a top surface 30a facing the observer 300, and the image display device 30 does not include any parallax barrier or lens array located between the top surface 30a and the backlight source 310.

In the present embodiment, as shown in FIG. 4, the backlight source 310 of the 3D display module 100 is such as a backlight source producing a plurality of linear lights. For example, the backlight source includes a plurality of linear light sources separated from each other by a backlight pitch Pb, and the view unit pitch Pv of the view units is larger than the backlight pitch Pb. As shown in FIG. 4, while the condition of Pb<Pv is satisfied, the virtual focus point Fv is thus located at the rear side of the 3D display module 100. In another embodiment, the backlight source could include a light-guiding element with white ink or black ink in a form of an oblique strip or at least a straight strip which can form the line-shaped backlight with the backlight pitch Pb.

Figure 5:
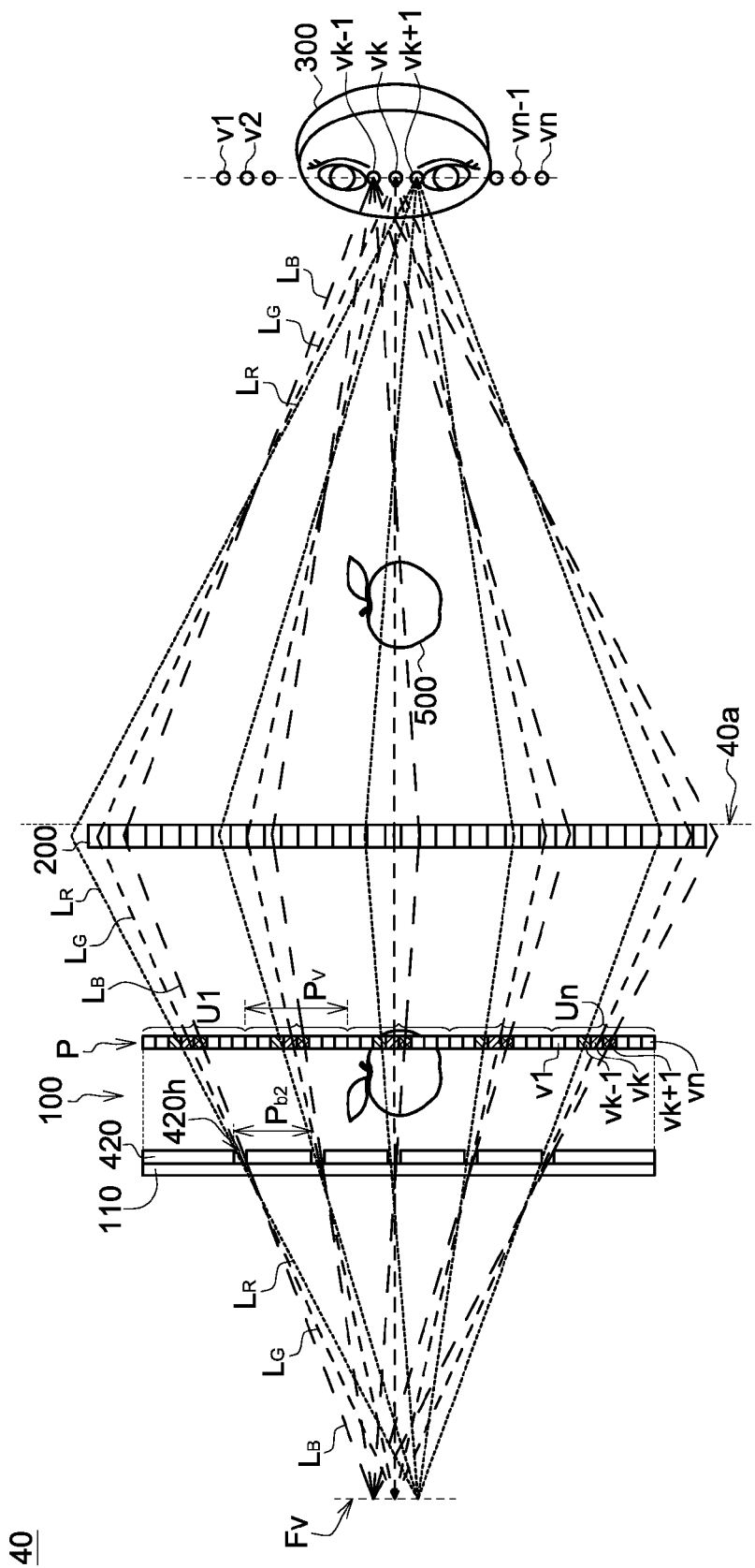
FIG. 5 is a schematic view of an image display device according to a still further embodiment of the present disclosure.

FIG. 5 is a schematic view of an image display device 40 according to a still further embodiment of the present disclosure. The elements in the present embodiment sharing the same or similar labels with those in the previous embodiment are the same or similar elements, and the description of which is omitted.

In the embodiment as shown in FIG. 5, the image display device 40 has a top surface 40a facing the observer 300, and the image display device 40 does not include any parallax barrier or lens array located between the top surface 40a and the backlight source 110.

In the embodiment, as shown in FIG. 5, the 3D display module 100 includes a barrier layer 420 disposed between the backlight source 110 and the pixels P. The barrier layer 420 has a plurality of openings 420h for allowing the backlight source 110 to produce a plurality of light beams through the openings 420h.

In the embodiment, the adjacent two openings 420h are separated by a rear barrier pitch Pb2, and the view unit pitch Pv of the view units is larger than the rear barrier pitch Pb2. As shown in FIG. 5, while the condition of Pv>Pb2 is satisfied, the virtual focus point Fv is thus located at the rear side of the 3D display module 100.

In some embodiments of the present disclosure, the parallax barrier or the lenticular lens array may be disposed between the backlight source 110 and the virtual floating base plane where the 3D floating image 500 is located (not shown in drawings).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image display device, comprising:
    a 3D display module, comprising:
        a backlight source; and
        a plurality of pixels disposed above the backlight source, wherein the pixels provide a plurality of view units, and at least one of the view units comprises a plurality of views; and
    an optical component disposed above the 3D display module;
    wherein lights from the backlight source are concentrated at a virtual focus point, and the backlight source is located between the virtual focus point and the optical component.

2. The image display device according to claim 1, wherein the optical component comprises a crossed corner mirror array, a micro prism, a micro lens array, or a double lenticular lens film.

3. The image display device according to claim 1, wherein the 3D display module comprises a parallax barrier disposed between the optical component and the backlight source.

4. The image display device according to claim 3, wherein the parallax barrier has a plurality of openings, each of the openings are separated by a front barrier pitch, and at least one of the view units has a view unit pitch smaller than the front barrier pitch.

5. The image display device according to claim 4, wherein a distance from the virtual focus point to the parallax barrier is VD, a distance from the parallax barrier to the pixels is d1, and a ratio of the front barrier pitch to the view unit pitch is VD/(VD−d1).

6. The image display device according to claim 1, wherein the 3D display module comprises a lens array disposed between the optical component and the backlight source.

7. The image display device according to claim 6, wherein the lens array is a lenticular lens array or a liquid crystal (LC) gradient index (GRIN) lens array.

8. The image display device according to claim 6, wherein the lens array comprises a plurality of optical lenses, each of the optical lenses are separated by a lens pitch, and the view units have a view unit pitch smaller than the lens pitch.

9. The image display device according to claim 8, wherein a distance from the virtual focus point to the lens array is VD, a distance from the lens array to the pixels is d2, and a ratio of the lens pitch to the view unit pitch is VD/(VD−d2).

10. The image display device according to claim 1, wherein the backlight source produces a plurality of linear lights.

11. The image display device according to claim 1, wherein the 3D display module comprises a barrier layer disposed between the backlight source and the pixels, and the barrier layer has a plurality of openings.

12. The image display device according to claim 11, wherein the adjacent two openings are separated by a rear barrier pitch, and the view units have a view unit pitch larger than the rear barrier pitch.

13. The image display device according to claim 1, wherein an angular difference between the lights through the adjacent views is 0.1-0.4 degree.

14. The image display device according to claim 1, wherein the 3D display module comprises a parallax barrier or a lenticular lens array, the parallax barrier or the lenticular lens array disposed between the backlight source and a virtual floating base plane where a 3D floating image is formed.

15. The image display device according to claim 14, wherein the parallax barrier or the lenticular lens array disposed between the optical component and the virtual floating base plane.

16. The image display device according to claim 1, an order of the views in front of the optical component over a first distance is the same as the order of views provided by the pixels, wherein the first distance is the distance between the optical component and the backlight source.

* * * * *